(12) United States Patent
Bells et al.

(10) Patent No.: US 10,156,953 B2
(45) Date of Patent: Dec. 18, 2018

(54) METHOD FOR PRESENTING DATA ON A SMALL SCREEN

(75) Inventors: Matthew Bells, Waterloo (CA); Sherryl Lee Lorraine Scott, Toronto (CA)

(73) Assignee: BLACKBERRY LIMITED, Waterloo, Ontario ( * ) Notice: Subject to any disclaimer, the term of this patent is extended or adjusted under 35 U.S.C. 154(b) by 2558 days.

(21) Appl. No.: 11/616,309

(22) Filed: Dec. 27, 2006

(65) Prior Publication Data
US 2008/0163098 A1 Jul. 3, 2008

(51) Int. Cl.
*G06F 3/048* (2013.01)
*H04M 1/274* (2006.01)

(52) U.S. Cl.
CPC ............ *G06F 3/048* (2013.01); *H04M 1/274* (2013.01)

(58) Field of Classification Search
CPC .......... G06F 3/0489; G06F 3/023; G06F 9/00; G06Q 10/107; H04M 1/72583; H04M 1/247
USPC ....... 715/200, 221, 224, 225, 226, 230, 238, 715/764, 780, 781, 788, 800, 864
See application file for complete search history.

(56) References Cited

U.S. PATENT DOCUMENTS

| | | | |
|---|---|---|---|
| 5,805,164 A | 9/1998 | Blum et al. | |
| 6,157,967 A | 12/2000 | Horst et al. | |
| 6,202,060 B1 | 3/2001 | Tran | |
| 6,272,293 B1 | 8/2001 | Matama | |
| 6,341,316 B1 | 1/2002 | Kloba et al. | |
| 6,470,329 B1 | 10/2002 | Livschitz | |
| 6,536,037 B1 | 3/2003 | Guheen et al. | |
| 6,557,004 B1* | 4/2003 | Ben-Shachar et al. | 707/706 |
| 6,654,746 B1 | 11/2003 | Wong et al. | |
| 6,892,221 B2 | 5/2005 | Ricart et al. | |
| 6,904,570 B2* | 6/2005 | Foote et al. | 715/863 |
| 6,957,395 B1 | 10/2005 | Jobs et al. | |
| 7,007,239 B1* | 2/2006 | Hawkins et al. | 715/780 |
| 7,225,409 B1* | 5/2007 | Schnarel et al. | 715/747 |
| 7,577,272 B2 | 8/2009 | Harmanci et al. | |
| 7,680,513 B2* | 3/2010 | Haitani et al. | 455/556.2 |
| 7,685,296 B2 | 3/2010 | Brill et al. | |
| 7,689,601 B2 | 3/2010 | Wu | |
| 7,707,487 B2* | 4/2010 | Easter et al. | 715/225 |

(Continued)

FOREIGN PATENT DOCUMENTS

| | | |
|---|---|---|
| EP | 0171663 A2 | 2/1986 |
| EP | 1215596 A1 | 6/2002 |

(Continued)

OTHER PUBLICATIONS

Brinkschulte, C., et al.: "SyncML Client Server", Internet Citation, Jan. 10, 2003, XP002346046, URL: http://www.weblicon.net/downloads/e_documents/SyncML_Client_Server_1.8.pdf.

(Continued)

*Primary Examiner* — Rashawn N Tillery
(74) *Attorney, Agent, or Firm* — Perry + Currier Inc.

(57) ABSTRACT

A method and apparatus for controlling display of data on a screen of a portable electronic device. The method includes launching an application that includes at least one field for receiving data and at least one field label for identifying the at least one field, entering data into the at least one field and removing the at least one field label from the screen when data is entered into the at least one field.

24 Claims, 10 Drawing Sheets

(56) References Cited

U.S. PATENT DOCUMENTS

| | | |
|---|---|---|
| 2002/0069218 A1 | 6/2002 | Sull et al. |
| 2002/0123368 A1* | 9/2002 | Yamadera et al. ............ 455/556 |
| 2002/0132612 A1 | 9/2002 | Ishii |
| 2002/0147661 A1 | 10/2002 | Hatakama |
| 2003/0134625 A1 | 7/2003 | Choi |
| 2004/0036722 A1* | 2/2004 | Warren .......................... 345/866 |
| 2004/0039722 A1 | 2/2004 | Kudo et al. |
| 2004/0039989 A1* | 2/2004 | Warren .......................... 715/505 |
| 2004/0073868 A1* | 4/2004 | Easter et al. ................... 715/507 |
| 2004/0224672 A1 | 11/2004 | Linkert et al. |
| 2004/0243256 A1 | 12/2004 | Willis et al. |
| 2005/0050473 A1* | 3/2005 | Lamb et al. ................... 715/744 |
| 2005/0060230 A1* | 3/2005 | Kaye ............................... 705/14 |
| 2005/0060370 A1 | 3/2005 | Xue et al. |
| 2005/0131900 A1 | 6/2005 | Palliyll et al. |
| 2005/0138176 A1 | 6/2005 | Singh et al. |
| 2005/0197906 A1 | 9/2005 | Kindig et al. |
| 2006/0008256 A1 | 1/2006 | Khedouri et al. |
| 2006/0010227 A1 | 1/2006 | Atluri |
| 2006/0010500 A1 | 1/2006 | Elazar et al. |
| 2006/0029296 A1 | 2/2006 | King et al. |
| 2006/0053383 A1* | 3/2006 | Gauthier et al. .............. 715/764 |
| 2006/0080427 A1 | 4/2006 | Yach et al. |
| 2006/0111086 A1 | 5/2006 | Wilson |
| 2006/0167784 A1 | 7/2006 | Hoffberg |
| 2006/0179404 A1* | 8/2006 | Yolleck et al. ................ 715/507 |
| 2006/0183097 A1 | 8/2006 | Ishii |
| 2006/0206582 A1 | 9/2006 | Finn |
| 2006/0211404 A1 | 9/2006 | Cromp et al. |
| 2006/0235864 A1 | 10/2006 | Hotelling et al. |
| 2006/0253796 A1* | 11/2006 | Wang et al. ................... 715/788 |
| 2006/0271870 A1* | 11/2006 | Anwar .......................... 715/764 |
| 2007/0061719 A1* | 3/2007 | Law .............................. 715/700 |
| 2007/0087756 A1 | 4/2007 | Hoffberg |
| 2007/0101278 A1* | 5/2007 | Pickering et al. ............. 715/762 |
| 2007/0118809 A1* | 5/2007 | Ozugur et al. ................ 715/776 |
| 2007/0250645 A1 | 10/2007 | Meadows et al. |
| 2007/0254721 A1 | 11/2007 | Griffin et al. |
| 2007/0281733 A1 | 12/2007 | Griffin et al. |

FOREIGN PATENT DOCUMENTS

| | | |
|---|---|---|
| EP | 1564658 A | 8/2005 |
| EP | 1798644 A | 6/2007 |
| GB | 2341952 A | 3/2000 |
| WO | 00/29977 A1 | 5/2000 |
| WO | 04/010306 A | 1/2004 |
| WO | 04/055659 A1 | 7/2004 |

OTHER PUBLICATIONS

"Time-Dependent Unsolicited Help" IBM Technical Disclosure Bulletin, IBM Corp, New Yrok, US, vol. 31 No. 3, Aug. 1, 1988, XP000106189, ISSN: 0018-8689. "the whole document".

Firefalcon; "Textbox with Tool Tip Control Implementation" The Code Project, [on line] Aug. 6, 2006, XP002435398. Retrieved from the Internet: URL:http //wwww.codeproject.com/useritems/textboxwithtooltipcontrol.asp> [retrieved on May 24, 2007] the whole document.

Studio 7.5: "Desigining for Small Screens" Oct. 2005, AVA Publishing SA, Lausanne, Switzerland, XP002435401 ISBN: 2-940373-07-8 p. 140-p. 141.

[Online] May 7, 2002 (May 7, 2002), XP007914509 The Code Project Retrieved from the Internet: URL: http://www.codeproject.com/KB/cpp/autocomplete_combobox.aspx [retrieved on Aug. 18, 2010].

European Patent Office correspondence "Summons to attend oral proceedings pursuant to Rule 115(1) EPC" dated Oct. 26, 2010 on corresponding European Patent Application No. 06127200.1.

Related Canadian Patent Application No. 2,615,561 Office Action dated Mar. 24, 2011.

Kaasten S. et al.: Designing an Integrated Bookmark/History System for Web Browsing, Proceedings Western Computer Graphics Symposium, Mar. 1, 2000 (Mar. 1, 2000) XP 008031090.

European Patent Application No. 06 127 202.7 Examination Report dated Apr. 13, 2011.

* cited by examiner

METHOD FOR PRESENTING DATA ON A SMALL SCREEN

FIELD

The present embodiment relates to a method for presenting data on a small screen, in particular, a screen of a portable electronic device.

BACKGROUND

Portable electronic devices such as cell phones, personal digital assistants, pagers, organizers and wireless mobile computing devices, for example, are becoming increasingly popular and, as a result, the functionality of these devices continues to expand. In order for users to access the many functions of the portable electronic device efficiently, the screen should be uncluttered and the input keys well organized. Providing an uncluttered appearance while still providing sufficient information to the user presents a challenge due to the small size of the screens of most portable electronic devices.

Figure 1:
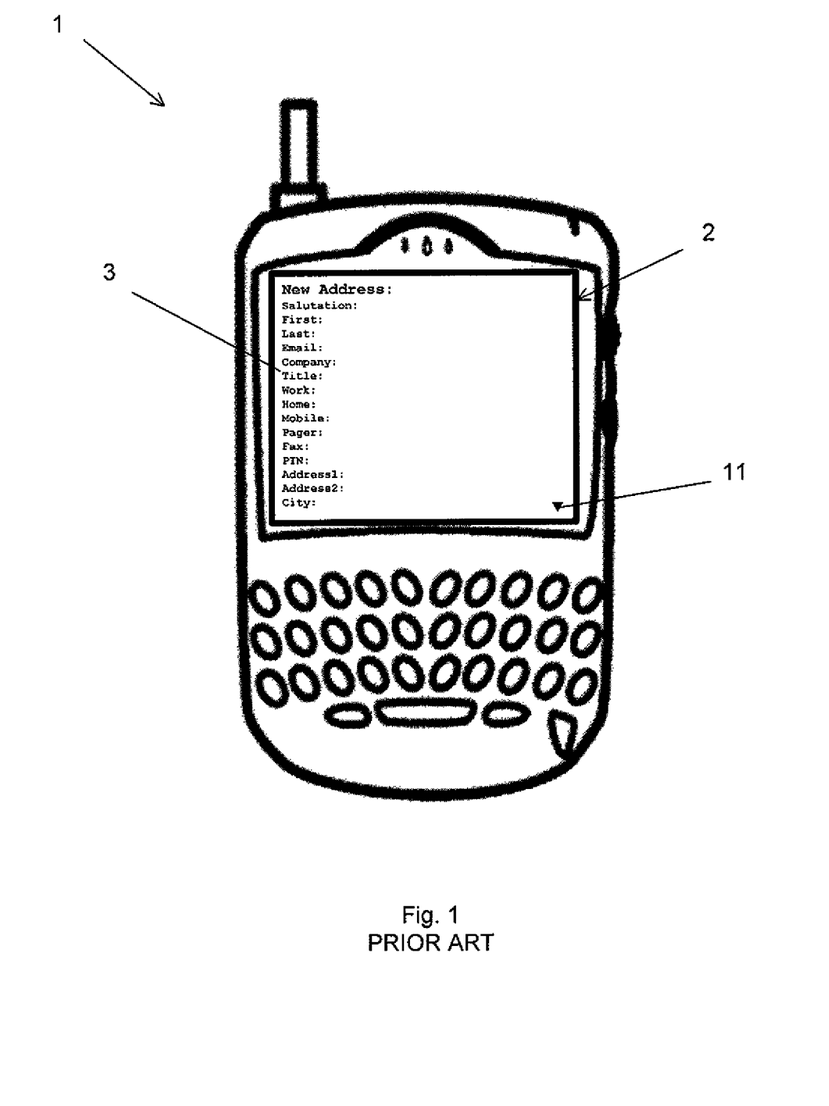
FIG. 1 is a front view of a prior art portable electronic device.

An example of a prior art portable electronic device 10 is generally shown in FIG. 1. The portable electronic device 1 includes a screen 2. By launching an address book application and navigating through menu options, a new address record 3 may be viewed. The new address record fills the entire screen 2 with multiple blank fields having field labels. This arrangement uses screen space inefficiently. Other portable electronic device applications also use screen space inefficiently and often also have a cluttered appearance, which is undesirable.

BRIEF DESCRIPTION OF THE DRAWINGS

The embodiments will be better understood with reference to the following Figures in which like numerals denote like parts and in which.

DETAILED DESCRIPTION OF THE PREFERRED EMBODIMENTS

There is described herein a method for controlling display of data on a screen of a portable electronic device including: launching an application, the application having a field for receiving data and a field label for identifying the field, prompting a user to enter data into the field and removing the field label from the screen when the data is entered into the field. A window of the application is displayed on a portion of the screen and the window is automatically resized to accommodate a volume of data for display.

There is further described herein a portable electronic device including a processor for launching an application, the application being provided in a window displayed on a screen of the portable electronic device. The application includes a field for receiving data and a field label for identifying the field. An input device is provided for entering data into the field and the field label is removed from the screen when the data is entered into the field. The window is automatically resized to accommodate a volume of data for display.

There is still further described herein a method for displaying a list of contacts in an address book application of a portable electronic device. The method includes: providing the list of contacts, which includes at least one contact name, a name record of the contact name being stored in the address book application and providing a visual identifier adjacent each contact name, the visual identifier being associated with a field of said name record. The visual identifier is provided when a corresponding field of the name record for the contact name is populated.

As shown in FIG. 1, prior art new address record 3 fills the entire screen 2 of portable electronic device 1. In fact, the new address record 3 fills at least two screens, as indicated by scroll indicator 11, which is provided in the lower right corner of the screen 2. Stored address records display both populated and blank fields. As such, each record fills more than one screen even in cases where only two or three fields are populated.

Figure 2:
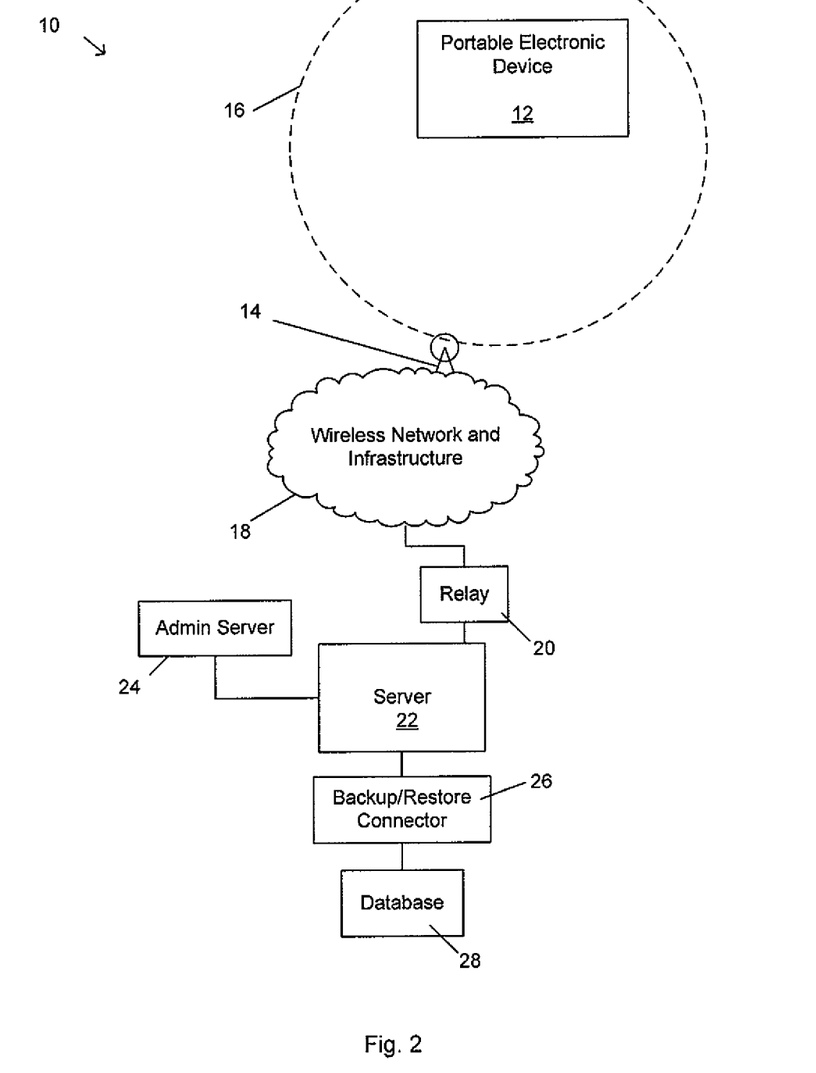
FIG. 2 is a functional block diagram of a communication system for portable electronic devices according to an embodiment.

Turning now to FIG. 2, a functional block diagram of a communication system 10 and a portable electronic device 12 is generally shown. The portable electronic device 12 and the communication system 10 are operable to effect communications over a radio communications channel therebetween.

For the purpose of illustration, the communication system 10 is functionally represented in FIG. 2 and includes a base station 14. Base station 14 defines a coverage area, or cell 16 within which communications between the base station 14 and the portable electronic device 12 can be effected. It will be appreciated that the portable electronic device 12 is movable within cell 20 and can be moved to coverage areas defined by other cells, including those that are not illustrated in the present example.

The base station 14 is part of a wireless network and infrastructure 18 that provides a link to the portable electronic device 12. The wireless network and infrastructure 18 includes additional base stations (not shown) that provide the other cells referred to above. Data is delivered to the portable electronic device 12 via wireless transmission from base station 14. Similarly, data is sent from the portable electronic device 12 via wireless transmission to the base stations 14.

Wireless networks and infrastructures include, for example, data-centric wireless networks, voice-centric wireless networks, or dual-mode wireless networks. For the purpose of the present exemplary embodiment, the wireless network and infrastructure 18 includes a dual-mode wireless network that supports both voice and data communications over the same physical base stations. The portable electronic device 12 communicates with the Internet through the wireless network and infrastructure 18.

The communication system 10 further includes a relay device 20 that is connected to the wireless network and infrastructure 18 and to a server 22. It will be understood that the functions provided by the relay device 20 and the server 22 can be embodied in the same device. The server 22 is also connected to an administration server 24, as shown. The administration server 24 provides administrative services to and control over the server 22.

The server 22 is also functionally coupled through a connector 26 to a backup/restore database 28. Other connectors and databases can be provided, for example, for synchronization purposes. The connector 26 receives commands from the server 22. It will be understood that the connector 26 is a functional component and can be provided by way of an application on the server 22. The backup/restore database 28 is used for storing data records, including, for example, copies of Short Message Service (SMS) or Personal Identification Number (PIN) messages sent from the portable electronic device 12.

Figure 3:
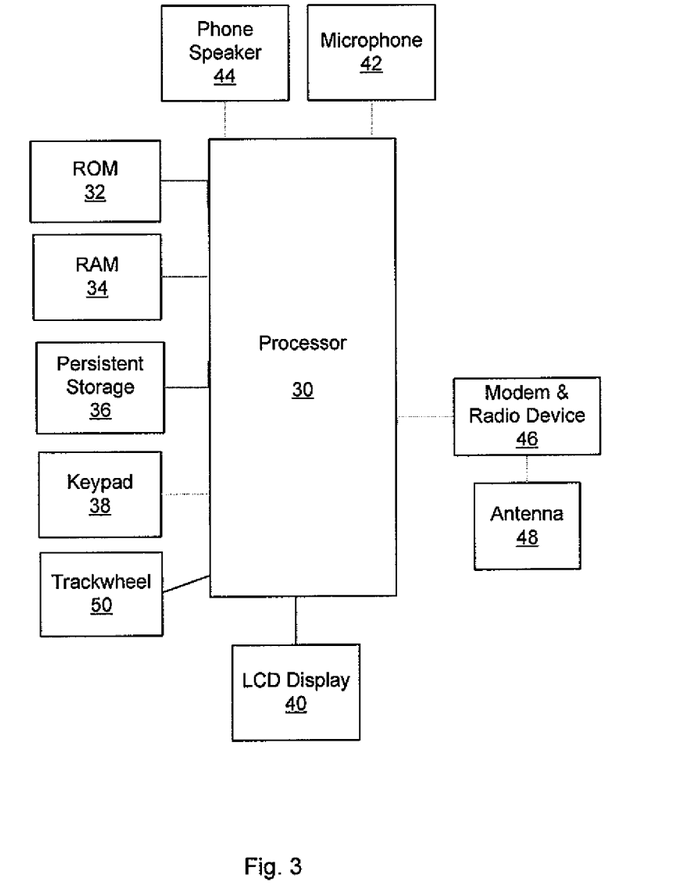
FIG. 3 is a functional block diagram of certain components of the portable electronic device of FIG. 2.

Referring now to FIG. 3, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to a wireless personal digital assistant. Other portable electronic devices are possible, such as cellular telephones, smart telephones, and laptop computers. Referring again to the present embodiment, the portable electronic device 12 is based on a microcomputer including a processor 30 connected to a Read Only Memory (ROM) 32 that contains a plurality of applications executable by the processor 30 that enables the portable electronic device 12 to perform certain functions including, for example, PIN message functions, SMS message functions and cellular telephone functions. The processor 30 is also connected to a random access memory unit (RAM) 34 and a persistent storage device 36 which are responsible for various non-volatile storage functions of the portable electronic device 12. The processor 30 receives input from various input devices including a keypad 38 and a trackwheel 50. The trackwheel 50 is located on a side of the portable electronic device 12 and can be rotated and inwardly depressed to provide user input. The processor 30 outputs to various output devices including an LCD display screen 40. A microphone 42 and phone speaker 44 are connected to the processor 30 for cellular telephone functions. The processor 30 is also connected to a modem and radio device 46. The modem and radio device 46 is used to connect to wireless networks using an antenna 48. The modem and radio device 46 transmits and receives voice and data communications to and from the portable electronic device 12 through the antenna 48.

The portable electronic device 12 is operable to effect two way communication of voice and data. Thus, the portable electronic device 12 transmits and receives voice and data communications over the wireless network and infrastructure 18 via wireless communications with the base station 14 over a radio communications channel.

Figure 4:
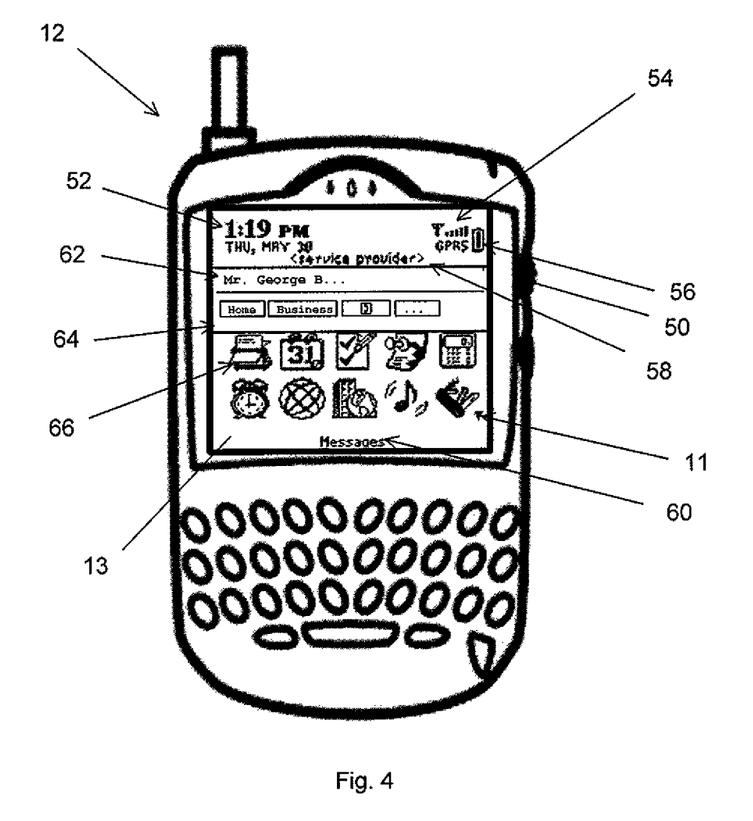
FIG. 4 is a front view of a portable electronic device of FIG. 2.

Referring to FIG. 4, the portable electronic device 12 according to an embodiment is shown. The portable electronic device 12 includes a screen 13 that displays a window 62. An address record 64, which is associated with an Address Book application, is displayed in the window 62. The address record 64 is launched by selecting an Address Book icon 66 and navigating through a menu (not shown). The menu pops up when a particular input key is selected so that the menu does not take up valuable screen space when not in use.

Unlike the prior art, the window 62 occupies only a portion of the screen 50 so that the information that is displayed is not limited to the application that is currently running. Time/date information 52, a signal strength indicator 54, a battery strength indicator 56 and a name of a service provider 58, which are located near the top of the screen 50, may be viewed by a user while working in a particular application. Similarly, near the bottom of screen 50, a new message indicator 60 is provided so that a user may quickly determine if new messages have arrived while working in the application. In addition, icons that represent the different applications and functions available on the portable electronic device 12 may also be viewed by the user. Icon 66, which is associated with the Address Book application, and additional application icons may be viewed by scrolling in the direction indicated by the scroll indicator 11.

The address book and other applications that are available on the portable electronic device 12 are stored in the persistent storage 36 thereof. By selecting the address book icon 66, the processor 30 executes the address book application and a list of contacts, which is stored in a Contacts Database in the persistent storage 36, is retrieved for display. The processor 30 relays information between the keypad 38, thumbwheel 50, screen 13 and the persistent storage 36 during operation of the application.

Figure 5:
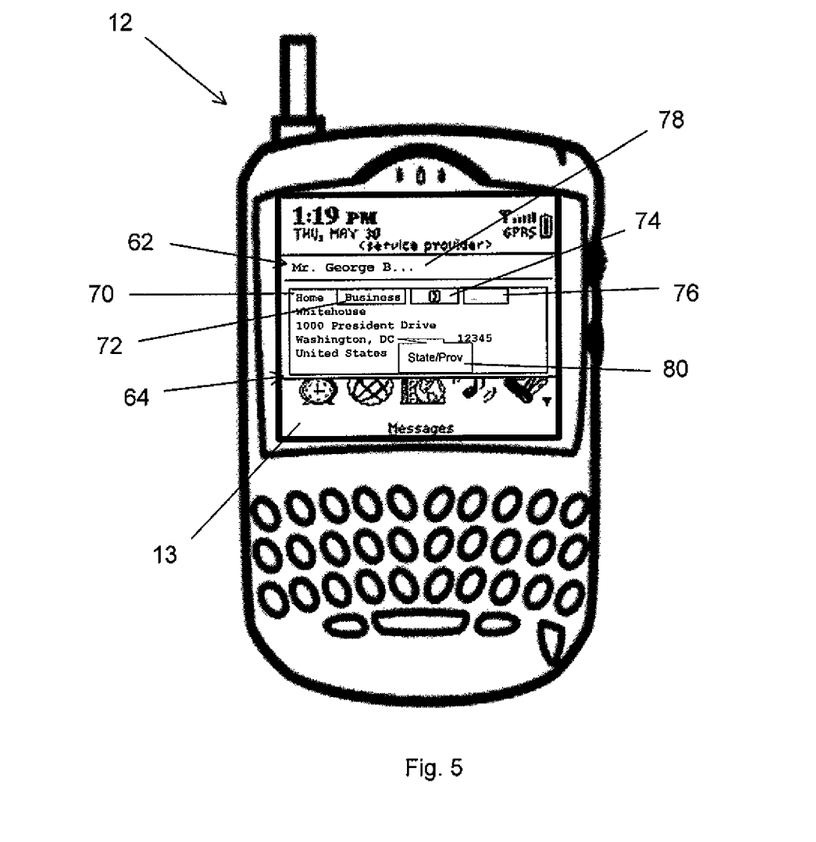
FIGS. 5 to 12 are screen shots of the portable electronic device according to an embodiment.

As shown in FIGS. 4 and 5, in the existing address record 64, the name field 78 appears near the top of the screen 50 and expandable regions 70, 72, 74 and 76 are selectable to view additional information associated therewith. By selecting expandable region 70, the user may view home addresses that are stored in the record 64. Similarly, selecting expandable region 72 allows the user to view business addresses and selecting expandable region 74 allows the user to view numbers, such as telephone numbers and facsimile numbers, for example. Expandable region 76 provides the user with other information that is associated with the name field 78. When any one of the expandable regions 70-76 are selected, the processor 30 operates to resize the window 62 to display the related information stored in the persistent storage 36. The window 62 may also be maximized to the size of the entire screen if required by the volume of related information.

It will be appreciated by a person skilled in the art that the number of expandable regions is not limited to four and the type of information that is stored within each expandable region may be categorized in any manner. For example, email addresses could be stored in a separate region and telephone/facsimile numbers could be stored with the addresses. Further, an expandable region entitled Notes may contain text entered by the user relating to the name record. Alternatively, an expandable region entitled Business2 may be provided to accommodate contacts that have more than one business address.

As shown in FIG. 5, the layout of the address information in the address record 64 is similar to an address as it would appear on a mailing label. There are no field labels, such as "country:" or "zip/postal:" code, for example, corresponding to each address component. Such field labels are unnecessary because the user knows the location of each field from experience. If the user is unsure of the contents of a particular field, the user may select the field thereby causing a pop-up window 80 to appear. As shown, the pop-up window 80 provides a short description of the contents of the field.

An advantage of the mailing label layout of the address information is that new users of the portable electronic device 12 will already be familiar with the layout. Therefore very little time will be spent learning how to navigate the address record. It is possible to provide an alternate layout that is not as common. The time required for a new user to become accustomed to the alternate layout, however, will be significantly greater than the time required for a new user to become accustomed to the mailing label layout.

Referring to FIGS. 6 to 12, screen shots of the portable electronic device are shown to describe the creation of an address record 64 according to an embodiment. Although navigation and selection of fields is described using the trackwheel 50, it will be appreciated by a person skilled in the art that other navigation and selection techniques may alternatively be used. For example, trackballs, touch pads, cursor keys, joy sticks, pen pointers or other suitable input devices may be used.

Figure 6:
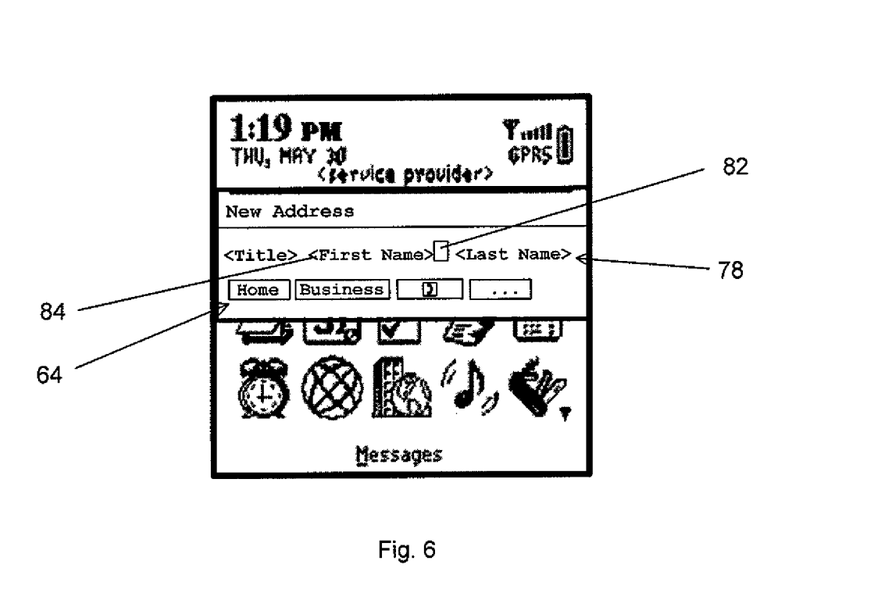
Figure 7:
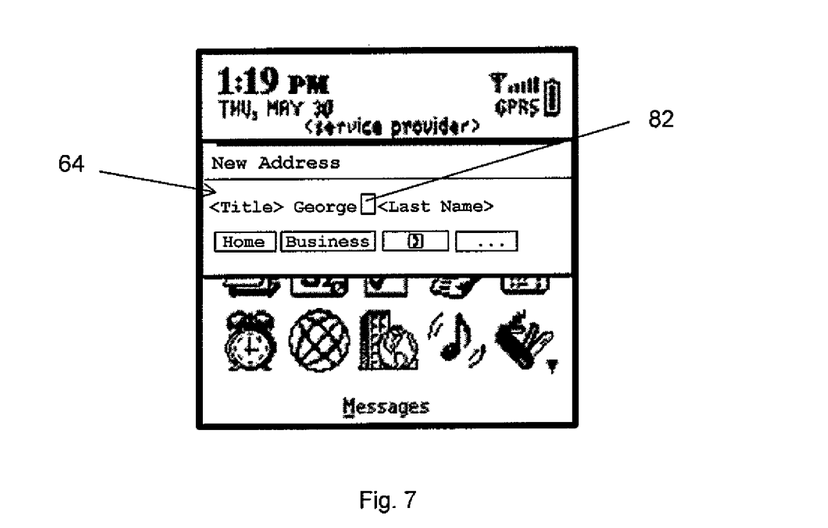

The user first navigates through menu options within the address book application using the trackwheel 50 to select a "create new record" option. Initially, the address record 64 includes several name fields that are provided above titled expandable regions 70-76, as shown in FIG. 6. A cursor 82 is scrolled through selectable fields within the application using the trackwheel 50. In FIG. 6, the cursor 82 is located in the First Name Field 84. As soon as the user begins to enter characters into the First Name field 84, as shown in FIG. 7, the field name is removed. This conserves screen space because the field name becomes unnecessary once content is provided in the field. As has already been described, by selecting the field, a pop-up window, which provides a short description of the contents of the field, appears. Therefore, in the embodiment, the field name is not only unnecessary but is redundant.

Figure 8:
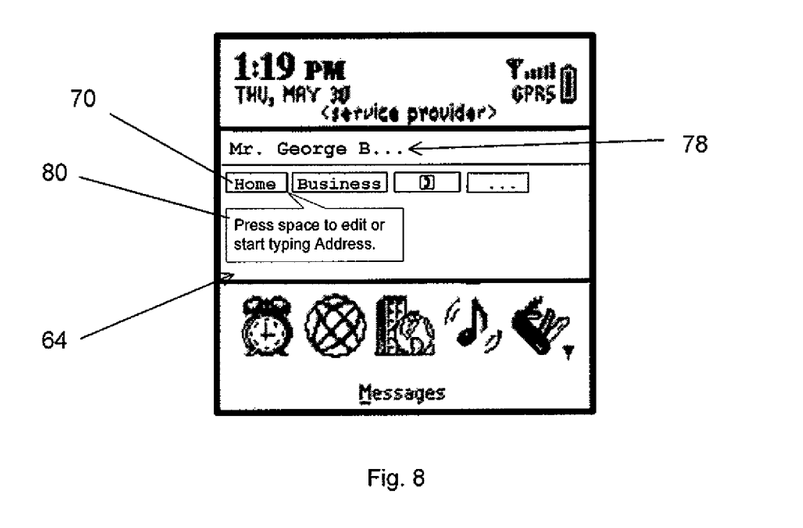

As shown in FIG. 8, once the Name field 78 has been populated, the "New Address" title is replaced therewith to further conserve screen space. The user may then proceed to fill in selected fields in the address record. As shown, pop-up window 80 appears when one of the expandable regions 70-76 is selected. As shown, the pop-up window 80 provides instructions to the user for filling in the address information. Instead of pressing the space bar to expand one of the expandable regions 70-76, as instructed by the pop-up window 80, the user may alternatively expand the expandable region 70-76 by using the trackwheel 50 or navigating through a menu.

Figure 9:
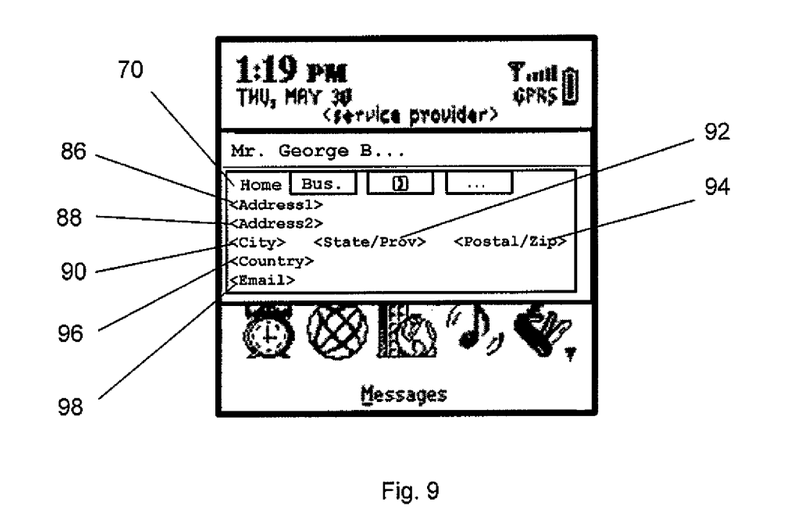
Figure 10:
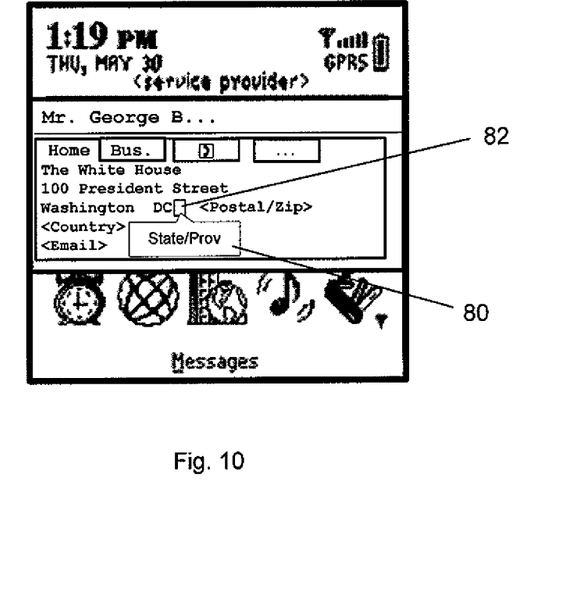

When the user begins typing, as directed by the pop-up window 80, the expandable region entitled Home 70 expands and a plurality of field labels appear in a mailing address layout, as shown in FIG. 9. The field labels include: Address1 86, Address2 88, City 90, State/Prov 92, Postal/Zip 94, Country 96 and Email 98. As the user scrolls using trackwheel 50 to locate the cursor 82 in each subsequent field and begins to enter characters, the field labels disappear, as shown in FIG. 10. Pop-up windows 80 are launched, which include the respective field labels, when characters are being entered into the field or the field is selected. The pop-up windows 80 do not launch immediately upon selection of the field. Instead a 0.5 second delay is provided. The delay may be lengthened or shortened as desired.

Figure 11:
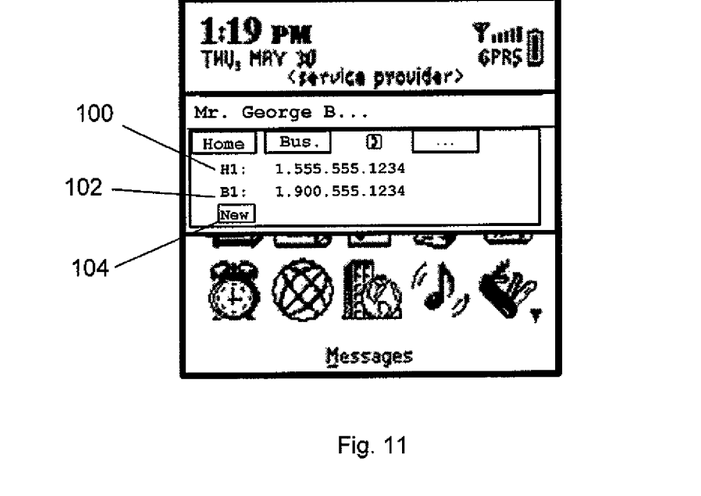
Figure 12:
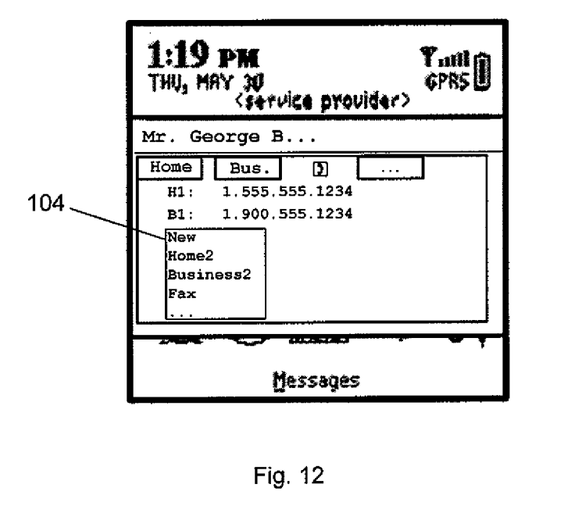

Referring to FIG. 11, expandable region 74 is expanded to show the various numbers stored on the address record 64 and allow the user to enter additional numbers. In this embodiment, abbreviated field labels are used in order to minimize the amount of space that is used. Alternatively, full field labels may be used. For example, H1 identifies the first home telephone number 100 and B1 identifies the first business telephone number 102. Both of these fields were created by selecting the "New" button 104, which expands as shown in FIG. 12 when selected. In order to enter a new number, the user first selects the type of number and then enters the number. When displayed, a short form will be used in order to conserve screen space. As number labels are used, they are removed from the new list so that only one of each type of number may be entered.

Figure 13:
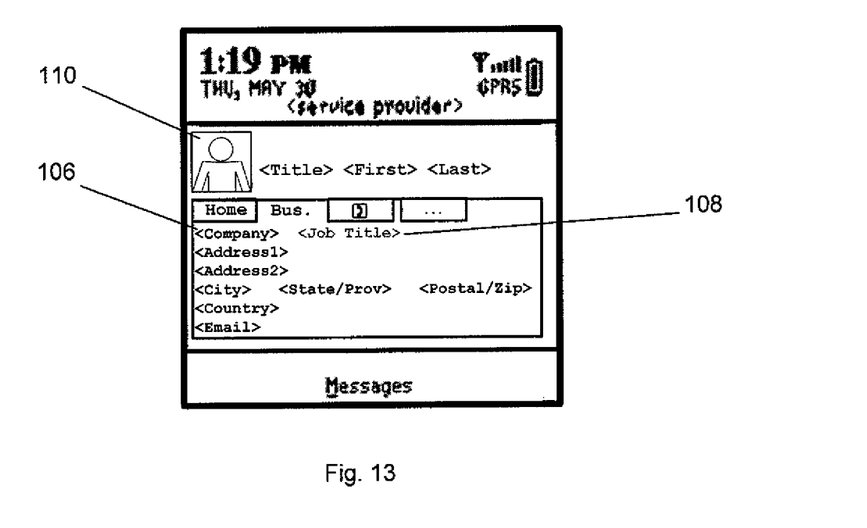
FIG. 13 is a screen shot of a portable electronic device according to another embodiment.

Another embodiment is shown in FIG. 13. In this embodiment, child fields are provided. The child fields are not shown until a parent field is selected. For example, a Job Title field 108, which is shown grayed for the purpose of illustration, is only displayed once characters have been typed into the Company field 106. In addition, a photo 110 may be included with each name record, if desired.

Figure 14:
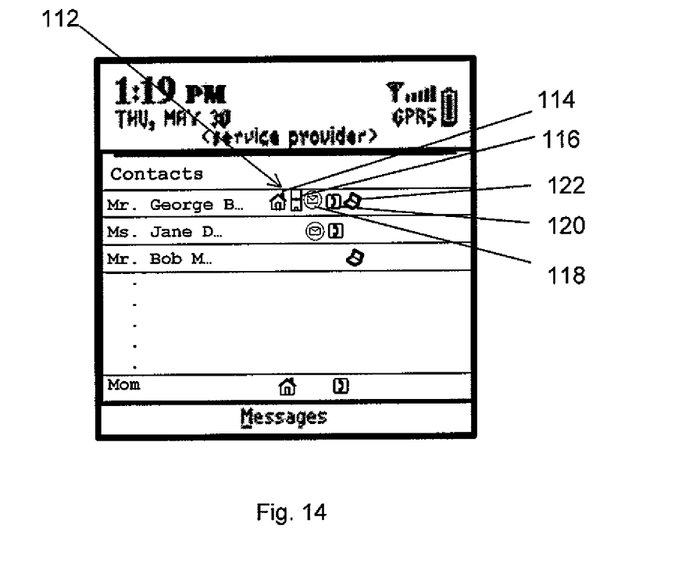
FIG. 14 is a screen shot of a portable electronic device according to still another embodiment.

Referring to FIG. 14, another embodiment is shown. In this embodiment, a contact list, which is generally a list of name fields 78 of name records 64, includes visual identifiers 112 adjacent the name field 78. The visual identifiers 112 correspond to fields of the name records in order to provide the user with a quick summary of the information that is contained in the record. For example, the record for contact "George B . . . " contains a home address, a business address, an email address, a telephone number and a web site address, which are identified by visual identifiers 114, 116, 118, 120 and 122, respectively. The visual identifiers 112 allow the user to determine quickly whether or not the record contains the desired information. For example, the user can see from the contact list that contact "Bob M . . . " does not have a telephone number associated therewith. The visual identifiers 112 may further be customized so that a user may easily differentiate between different types of telephone numbers and email addresses, for example. In another embodiment, each visual identifier is the same, however, the visual identifiers are colour coded so that a user can differentiate therebetween. For example, the visual identifiers can be circles that are coloured red, blue, orange and green to represent a home address, a business address, an email address and a web address. Any combination of visual identifier types and colours can be employed to provide a quick summary of information that is stored in a record may be provided.

Figure 15:
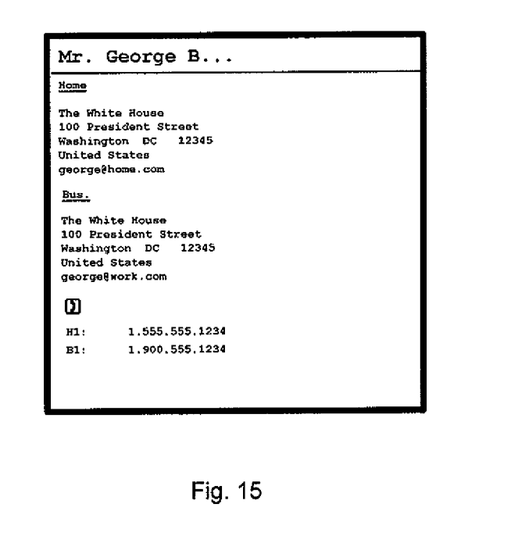
FIG. 15 is a screen shot of a portable electronic device according to yet another embodiment.

In another embodiment, an address record occupies the entire display screen, as shown in FIG. 15. Because the address record does not include any field labels, screen space is conserved, while the meaning of the data is maintained. As shown in FIG. 15, there is unused screen space available in the event that further information is added to this record.

In yet another embodiment, autocategorization software is provided to automatically assign categories when information is added to fields. This is useful to facilitate searching through the address records by using specific categories. Several default categories may be provided including "personal" and "business" for address book records. A business phone number, for example, would be retrieved if the search criteria included the category "business".

In still another embodiment, in order to allow a user to quickly identify which field has been assigned to which category, information entered on a name record is colour-coded based on its category. In one example, the colour red is assigned to the category "home" and the colour blue is assigned to the category "business". In this example, a first mobile telephone number is red and a second mobile telephone number is blue, a home telephone number is red and a business telephone number is blue. The colour scheme is used consistently throughout the database so that a user is able to quickly and easily identify the category of various telephone numbers associated when viewing various name records. It will be appreciated that any technique that allows a user to quickly and easily recognize the category of data being presented may be used. Possible techniques include each category being assigned a different font, a different highlight colour or a different text size. It will be appreciated that such techniques may be used on their own or may be combined with other techniques.

In yet another embodiment, recently viewed web page URLs that match a pattern being typed by the user are provided in a drop down combo box. This is useful when the user is entering a web page URL on an address record for a contact. If the web page has been previously visited using the portable electronic device 10, the URL will appear in the drop down combo box and thus save the user from having to re-type the address.

It will be appreciated by a person skilled in the art that the present embodiment is not limited to an Address Book application. Other types of applications including calendar appointments, memos or tasks, for example, may also employ similar data presentation techniques. In addition, other types of applications may also include autocategorization.

A specific embodiment has been shown and described herein. However, modifications and variations may occur to those skilled in the art. All such modifications and variations are believed to be within the sphere and scope of the present embodiment.

What is claimed is:

1. A method for controlling display of data on a screen of a portable electronic device, the method comprising:
    launching an application, the application having a parent-field, in a record in a window displayed on the screen, for receiving parent data, and a child-field for receiving child data;
    providing a parent-field label on the screen to identify the parent-field;
    prompting a user to enter the parent data into the parent-field by typing characters into the parent-field;
    removing the parent-field label from the screen when the parent data is typed into the parent-field;
    displaying the child-field in the record in the window on the screen,
    wherein the child-field is initially hidden but becomes displayed once at least one character is typed into the parent-field, the child-field including a child-field label to identify the child-field, and thereafter;
        prompting the user to enter child data into the child-field by typing further characters into the child-field; and
        removing the child-field label from the screen when the child data is typed into the child-field.

2. A method as claimed in claim 1, further comprising launching a pop-up window when the parent-field is selected, the pop-up window displaying the parent-field label.

3. A method as claimed in claim 1, wherein the parent-field label is replaced with an abbreviated parent-field label.

4. A method as claimed in claim 3, wherein the abbreviated parent-field label is a first letter of the parent-field label.

5. A method as claimed in claim 1, wherein a plurality of parent-fields are provided for receiving data, the plurality of parent-fields being provided in a mailing address layout with each of the plurality of parent-fields corresponding to an address component.

6. A method as claimed in claim 1, further comprising assigning the parent-field to a category.

7. A method as claimed in claim 6, wherein text of the parent-field is provided in a selected colour in order to identify the field as a member of the category.

8. A method as claimed in claim 6, wherein text of the parent-field is provided in a selected font in order to identify the field as a member of the category.

9. A method as claimed in claim 1, wherein the parent-field is for a web page URL.

10. A method as claimed in claim 1, wherein the application is an address book application and multiple parent-fields are provided, the multiple parent-fields including at least one telephone number field.

11. A portable electronic device comprising:
    a processor for launching an application, the application being provided in a window displayed on a screen of the portable electronic device, the application having a parent-field, in a record in the window displayed on the screen, for receiving parent data by receiving characters typed into the parent-field, a parent-field label being provided to identify the parent-field, and a child-field for receiving child data;
    an input device for typing data into the parent-field and the child-field;
    wherein the processor is configured to remove the parent-field label from the screen when the parent data is typed into the parent-field and to display the child-field in the record in the window on the screen, wherein the child-field is initially hidden but becomes displayed once at least one character is typed into the parent-field, the child-field including a child-field label to identify the child-field;
    the processor further configured to remove the child-field label from the child field when the child data is entered into the child-field by receiving further characters typed into the child-field.

12. A portable electronic device as claimed in claim 11, wherein a pop-up window is launched when the parent-field is selected, the pop-up window displaying the parent-field label.

13. A portable electronic device as claimed in claim 11, wherein the parent-field label is replaced with an abbreviated parent-field label.

14. A portable electronic device as claimed in claim 13, wherein the abbreviated parent-field label is a first letter of the parent-field label.

15. A portable electronic device as claimed in claim 11, wherein a plurality of parent-fields are provided for receiving parent data, the plurality of parent-fields being provided in a mailing address layout with each of the plurality of parent-fields corresponding to an address component.

16. A portable electronic device as claimed in claim 11, further comprising assigning the parent-field to a category.

17. A portable electronic device as claimed in claim 16, wherein text of the parent-field is provided in a selected colour in order to identify the parent-field as a member of the category.

18. A portable electronic device as claimed in claim 16, wherein text of the parent-field is provided in a selected font in order to identify the parent-field as a member of the category.

19. A portable electronic device as claimed in claim 11, wherein the parent-field is for a web page URL.

20. A portable electronic device as claimed in claim 11, wherein the application is an address book application and multiple parent-fields are provided, the multiple parent-fields including at least one telephone number field.

21. A method as claimed in claim 1, wherein the application is an address book application and multiple parent-fields are provided, populated parent-fields for each name record are identified by visual icon identifiers that are provided adjacent a corresponding name in a list of contacts to provide a summary of information contained in the name record, each the visual icon identifier customized to differentiate between different types of fields in the name records.

22. A method for displaying a list of contacts in an address book application of a portable electronic device, the method comprising:
   providing the list of contacts, the list including at least one contact name, a name record of the contact name being stored in the address book application; and
   providing visual icon identifiers adjacent each contact name, and on a same line as each the contact name, each the visual icon identifier being associated with a respective populated field of the name record;
   wherein each the visual icon identifier is provided when a corresponding populated field of the name record for the contact name is populated to provide a summary of information contained in the name record, each the visual icon identifier customized to differentiate between different types of fields in the name record, and every populated field in the name record is represented by a different visual identifier.

23. A method as claimed in claim 22, wherein multiple visual icon identifiers are provided adjacent the contact name to indicate which fields of the name record are populated.

24. A method as claimed in claim 22, wherein each the visual icon identifier indicates that there is at least one of a telephone number field and an e-mail field populated in the name record.

* * * * *